United States Patent
Fujita et al.

[11] Patent Number: 5,917,850
[45] Date of Patent: Jun. 29, 1999

[54] SPREAD SPECTRUM RECEIVING APPARATUS

[75] Inventors: Takao Fujita, Fujisawa; Toshihiko Myojo; Norihiro Mochizuki, both of Yokohama; Tadashi Eguchi, Kawasaki; Rie Suzuki, Yokohama, all of Japan

[73] Assignee: Canon Kabushiki Kaisha, Tokyo, Japan

[21] Appl. No.: 08/561,278

[22] Filed: Nov. 21, 1995

[30] Foreign Application Priority Data

| Nov. 24, 1994 | [JP] | Japan | 6-289847 |
| Feb. 24, 1995 | [JP] | Japan | 7-036942 |
| May 30, 1995 | [JP] | Japan | 7-131817 |
| Jun. 8, 1995 | [JP] | Japan | 7-167031 |
| Sep. 26, 1995 | [JP] | Japan | 7-247598 |

[51] Int. Cl.$^6$ ............ H04B 15/00; H04K 1/00; H04L 27/30
[52] U.S. Cl. ............ 375/200; 375/371; 327/141
[58] Field of Search .............. 375/200–210, 375/343, 366, 367, 371; 380/34, 48; 327/141, 147, 149

[56] References Cited

U.S. PATENT DOCUMENTS

| 4,691,326 | 9/1987 | Tsuchiya | 375/200 |
| 4,841,551 | 6/1989 | Avaneas | 375/373 |
| 4,924,188 | 5/1990 | Akazawa et al. | 375/200 |
| 4,942,590 | 7/1990 | Terada | 375/200 |
| 5,058,128 | 10/1991 | Kurihara et al. | 375/200 |
| 5,084,901 | 1/1992 | Nagazumi | 375/200 |
| 5,093,841 | 3/1992 | Vancraeynest | 375/200 |
| 5,150,377 | 9/1992 | Vannucci | 375/200 |
| 5,164,628 | 11/1992 | Egara et al. | 310/313 |
| 5,200,663 | 4/1993 | Mochizuki et al. | 310/313 |
| 5,260,969 | 11/1993 | Kato et al. | 375/200 |
| 5,353,304 | 10/1994 | Mochizuki | 375/200 |
| 5,367,216 | 11/1994 | Egara et al. | 310/313 |
| 5,491,458 | 2/1996 | McCune, Jr. et al. | 332/144 |

*Primary Examiner*—Chi H. Pham
*Assistant Examiner*—Bryan Webster
*Attorney, Agent, or Firm*—Fitzpatrick, Cella, Harper & Scinto

[57] ABSTRACT

A spread spectrum receiving apparatus is constructed by a generator for generating a reference clock, a phase shift circuit for shifting the phase of the reference clock generated by the generator in accordance with a code timing in a reception signal and the reference clock, and a de-spreading circuit for de-spreading the reception signal in accordance with the reference clock whose phase is shifted by the phase shift circuit. The de-spreading circuit generates a code for de-spreading in accordance with the phase shifted reference clock. The phase shift circuit has a calculator for calculating a phase shift amount so as to synchronize the code timing in the reception signal with the code for reception in accordance with a deviation between the code timing in the reception signal and the reference clock.

14 Claims, 15 Drawing Sheets

5,917,850

SPREAD SPECTRUM RECEIVING APPARATUS

BACKGROUND OF THE INVENTION

1. Field of the Invention

The invention relates to a receiving apparatus for receiving a spread spectrum signal.

2. Related Background Art

In a spread spectrum communication, a clock signal synchronized with data which is transmitted to demodulate a signal and a code timing need to be extracted on the demodulation side.

For this purpose, a convolution integration of a reception signal and the same PN (pseudo noise) code as that of the reception signal which was generated on the demodulation side is executed by an analog convolution integrator such as convolver, matched filter, or the like of an SAW (surface acoustic wave) device, and a clock signal and a code timing is extracted from an output of the analog convolution integrator.

FIG. 18 shows a conventional sync circuit using a convolver. A high frequency unit 21 converts a reception signal to an intermediate frequency and outputs to a convolution integrator 11B. A sync clock is reproduced by using a PLL (phase locked loop) circuit which inputs a signal indicative of a peak value timing of a signal extracted from an output of the convolution integrator 11B through a timing extraction circuit 12B and which is constructed by a phase comparator 14X, a loop filter 14Y, a sample holder 14Z, a voltage controlled oscillator (VCO) 13B, and a code generator 16B. The PLL is locked with a peak value timing of an input and a clock synchronization and a code timing synchronization are established. To hold such a state, the sample holder 14Z is set to a holding mode, thereby holding an input voltage of the VCO. By holding an input voltage of the VCO, a synchronization with the data is held and a demodulation unit 23 reproduces data by using a sync clock.

In the conventional apparatus, however, since the VCO output becomes a clock for reproduction upon reproduction of the data, it is necessary to select an output whose phase noises (jitter) are enough small for a clock frequency. Since there is a trade-off relation between a gain (output frequency/input voltage) of the VCO 13B and the jitter, a level of the gain is limited. A pull-in speed of the PLL is restricted by the limitation of the gain, so that a data transmitting speed deteriorates.

Since the sample holder 14Z by the analog circuit is used to hold the VCO input voltage, error factors such as holding step, droop characteristics, and the like occur and it is difficult to hold accurate frequency and phase for a long time in a data interval. The maximum length, therefore, of the data is limited.

SUMMARY OF THE INVENTION

It is an object of the present invention to improve a construction or a procedure for receiving a spread spectrum signal.

Another object of the invention is to simplify a construction and a procedure for receiving a spread spectrum signal.

Still another object of the invention is to match a synchronization to receive a spread spectrum signal at a high speed.

Further another object of the invention is to accurately match a synchronization to receive a spread spectrum signal.

The above and other objects and features of the present invention will become apparent from the following detailed description and the appended claims with reference to the accompanying drawings.

DETAILED DESCRIPTION OF THE PREFERRED EMBODIMENTS

Figure 1:
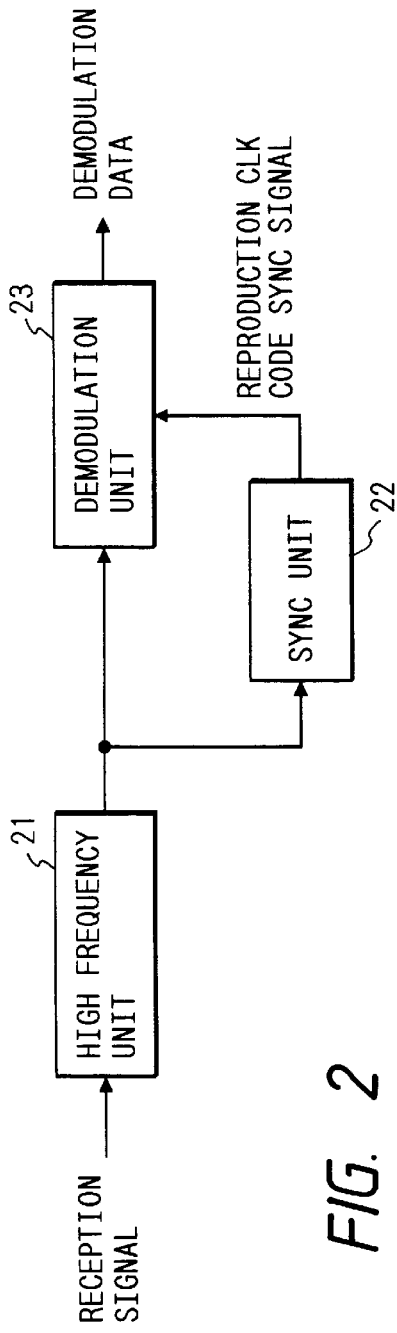
FIG. 1 is a schematic constructional diagram of a receiving apparatus for a spread spectrum communication.

FIG. 1 is a fundamental constructional diagram of a receiving apparatus of a spread spectrum communication system embodying the invention. In FIG. 1, a reception signal is subjected to processes such as amplification, filtering, and the like by the high frequency unit 21 and is directly outputted as a signal of an input frequency or is converted to a signal of an intermediate frequency or a base band frequency and is outputted. An output from the high frequency unit 21 is inputted to a sync unit 22 and is subjected to a code synchronization between clock reproduction and spreading code. The output from the high frequency unit 21 is also inputted to the demodulation unit 23 and is data demodulated. The demodulation unit 23 generates a code for demodulation in accordance with a code sync signal inputted from the sync unit 22 and a reproduction clock, thereby de-spreading the reception signal.

Figure 2:
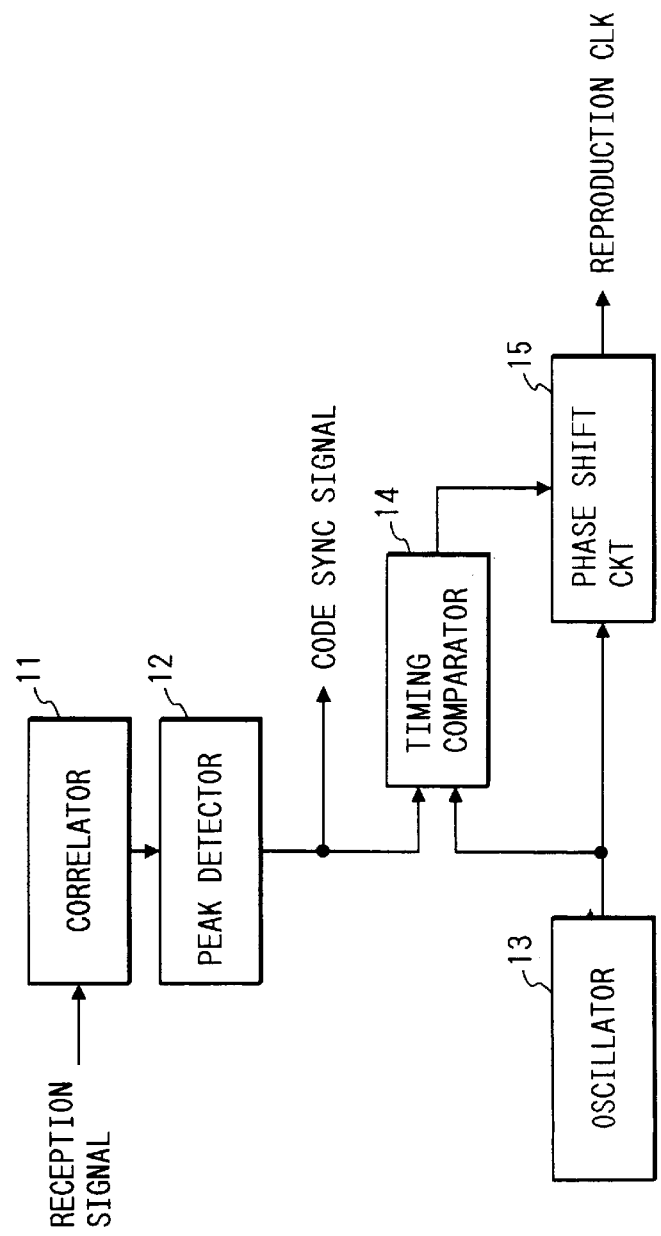
FIG. 2 is a block diagram showing the first embodiment of the invention.

FIG. 2 is a block diagram of the sync unit 22 of a first receiving apparatus of the spread spectrum communication system embodying the invention. Reference numeral 11 denotes a correlator for obtaining a correlation between the reception signal and a reference code. As a correlator 11, there is a correlator in which the reference code has been written (for example, delay line with a surface acoustic wave tap) or a correlator such that the reference code is inputted from the outside (for instance, surface acoustic wave convolver, digital matched filter).

Reference numeral 12 denotes a peak detector for detecting a peak signal whose level is higher than a predetermined level from an output signal of the correlator 11 and outputting a peak timing signal. Reference numeral 13 denotes an oscillator such as quartz oscillator, temperature compensating type quartz oscillator, or the like for generating a stable frequency. The frequency is set to be almost equal to a clock frequency used in the spread modulation on the transmission side.

Reference numeral 14 denotes a timing comparator for comparing the peak timing signal from the peak detector 12 with an output signal from the oscillator 13, measuring a deviation between the timings of both of those signals, and outputting a phase shift signal to a phase shift circuit 15 in accordance with the deviation amount. Reference numeral 15 denotes the phase shift circuit for shifting the phase of the output signal from the oscillator 13 in accordance with the phase shift signal which is inputted from the timing comparator 14.

Figure 3:
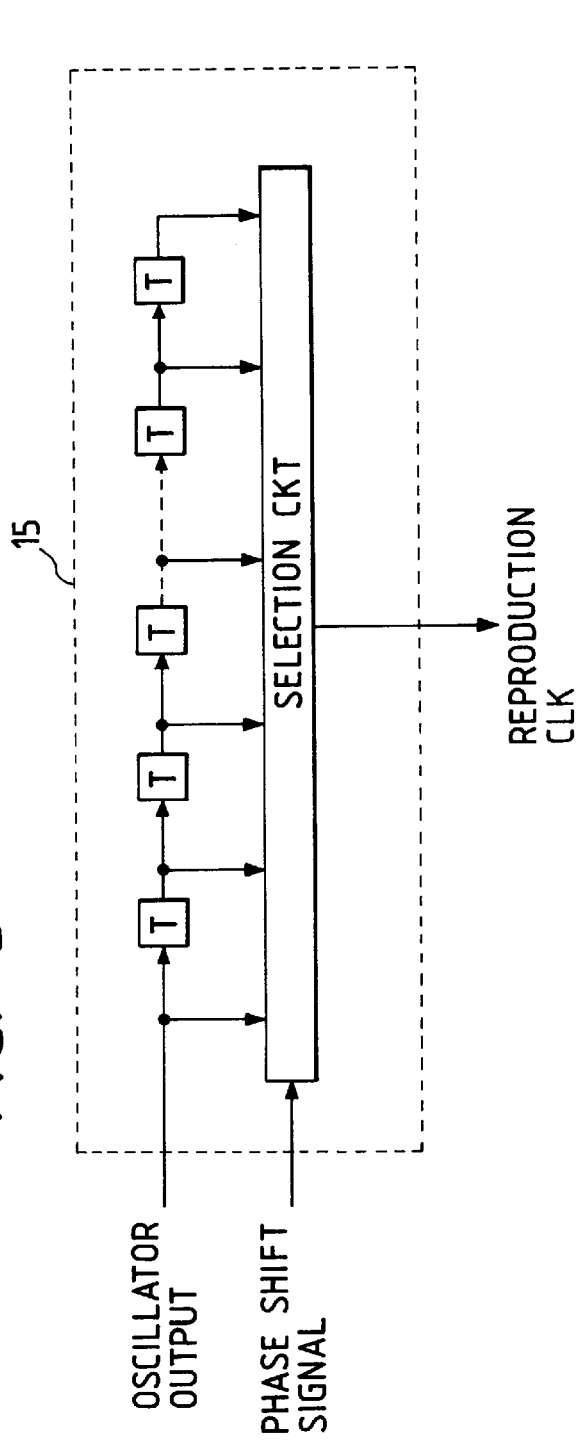
FIG. 3 is a block diagram showing a phase shift circuit 15.

The phase shift circuit 15 is constructed as shown in, for example, FIG. 3. In FIG. 3, the output of the oscillator 13 is inputted to a circuit constructed by cascade connecting delay circuits (T) having delay amounts of almost equal intervals. A signal which was delayed by a predetermined time, namely, a phase shifted signal is outputted from each of the delay circuits. One of the plurality of phase shifted signals is selected in accordance with the phase shift signal and is outputted as a reproduction clock. By setting a delay amount T of the N delay circuits which are cascade connected to a value that is 1/(N+1) times as high as a period of the output signal from the oscillator 13, the reproduction clock can be selected at a phase interval of 360/(N+1) deg. As the value of N is large, a precision of the selection phase rises and it is desirable to set the value of N to 3 or more.

Figure 4:
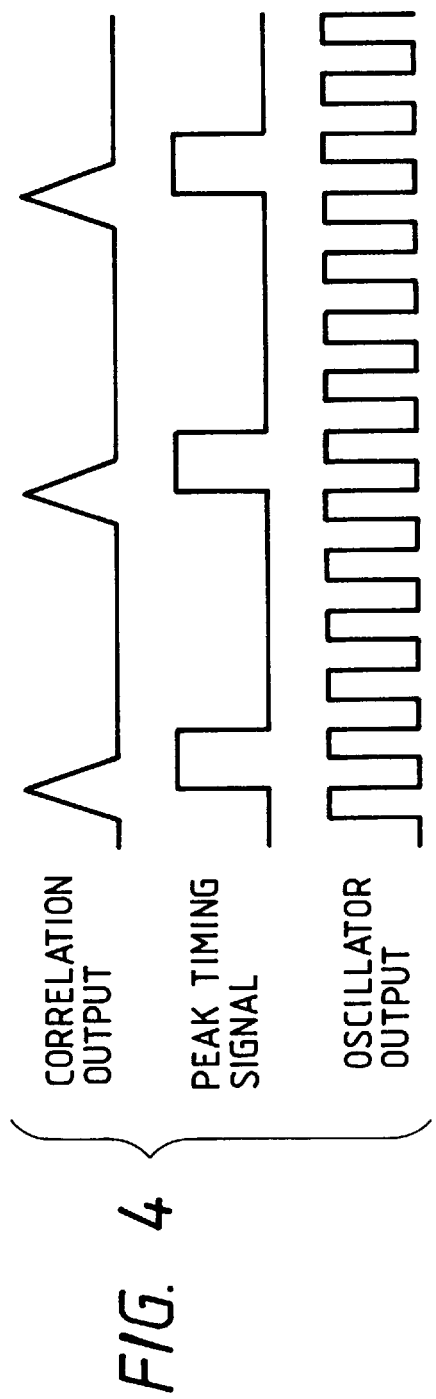
FIG. 4 is a schematic explanatory diagram of an output signal from each block.

FIG. 4 is a schematic explanatory diagram of a signal that is outputted from each block. The operation of the construction will now be described with reference to FIGS. 2 and 4. In the construction, the reception signal subjected to proper signal processes by the high frequency unit 21 is subjected to a correlation arithmetic operation with the reference code by the correlator 11. When the reference code coincides with the reception signal, a relatively large peak output is obtained by the correlator 11. The correlation output is inputted to the peak detector 12. The peak detector 12 forms a peak timing signal indicative of the peak position for a peak output exceeding a threshold value which was variably or fixedly set and generates the peak timing signal.

A clock of a frequency that is almost equal to a chip speed of a spreading code on the transmission side is generated from the oscillator 13 and is inputted to the timing comparator 14 together with the peak timing signal. The comparator 14 calculates a deviation of the timings between both of those signals and outputs a phase shift signal corresponding to the deviation amount to the phase shift circuit 15. The relation between the deviation amount and the phase shift amount is determined in consideration of the circuit delay or the like. In response to the phase shift signal, the phase shift circuit 15 shifts the phase of the output signal from the oscillator 13 and outputs a phase shifted signal as a reproduction clock.

The reproduction clock is inputted to the demodulation unit 23 together with a code sync signal and the data demodulation is executed. The code sync signal is formed from the peak timing signal.

Figure 5:
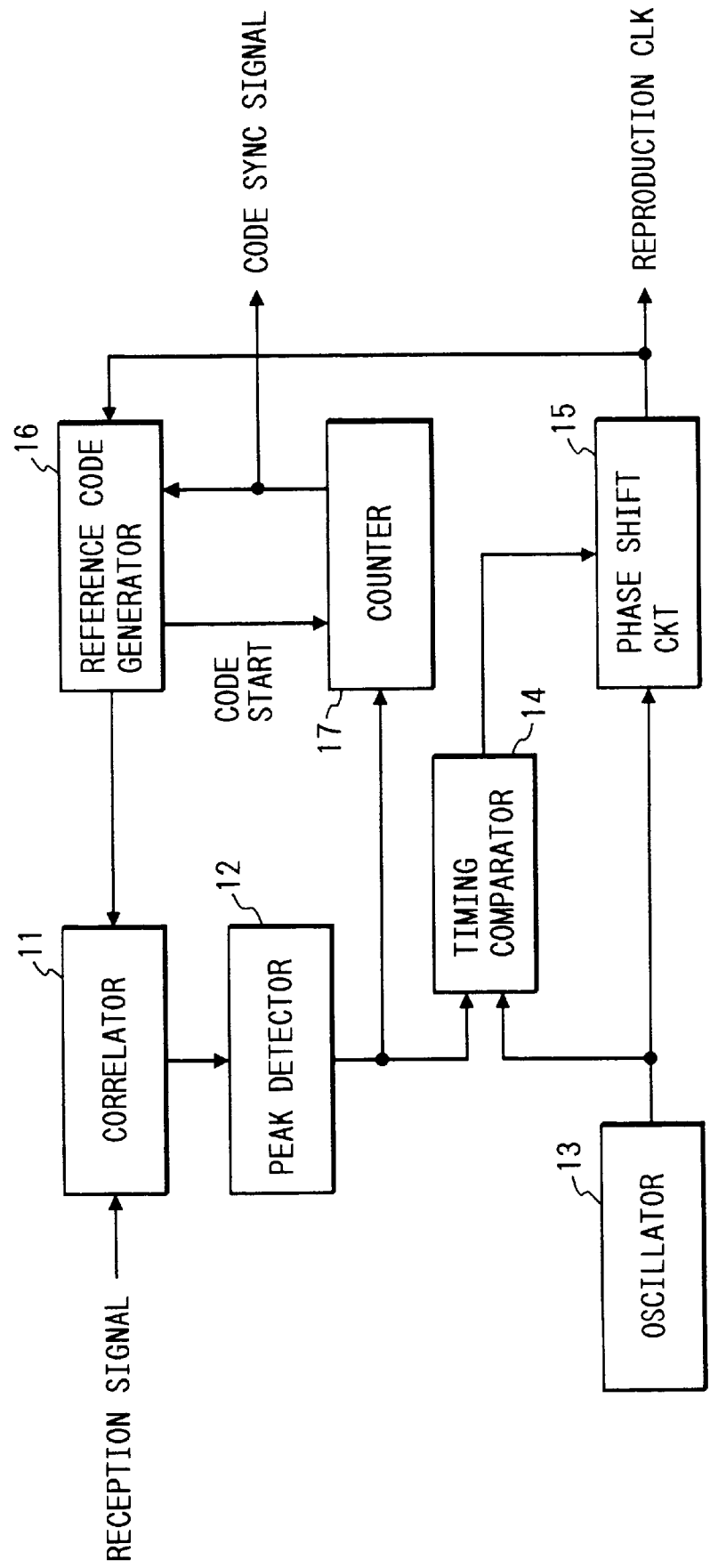
FIG. 5 is a block diagram showing the second embodiment of the invention.

FIG. 5 is a constructional diagram of the second embodiment in the case where a device/circuit such as a surface acoustic wave convolver or the like for inputting a reference signal from the outside is used as a correlator. In the embodiment, component elements similar to those shown in the first embodiment are designated by the same reference numerals. The embodiment differs from the first embodiment with respect to a point that the reproduction clock that is outputted from the phase shift circuit 15 is inputted to a reference code generator 16 and the reference code that is generated from the reference code generator 16 is inputted to the correlator.

In the case where the reference code has been written in the correlator, the peak timing signal is used as a code sync signal. However, in case of inputting the reference code from the outside to the correlator 11, the code sync signal is formed by a counter 17.

The reference code generator 16 outputs a code start signal at a code start point of the reference code. The counter 17 counts the number of reproduction clocks until the peak timing signal is inputted after the code start signal was inputted. When a count value is equal to K, the counter 17 outputs the code sync signal when K reproduction clocks are counted after the peak timing signal was inputted. When the code sync signal is inputted, the reference code generator 16 and demodulation unit 23 generates the reference code and the code for demodulation from the code start point.

Even in the embodiment, operation and effect similar to those of the first embodiment are derived. Similar operation and effect are also obtained even in the case where the clock that is inputted to the reference code generator 16 is not the reproduction clock but the signal which is generated from the oscillator 13.

Figure 6:
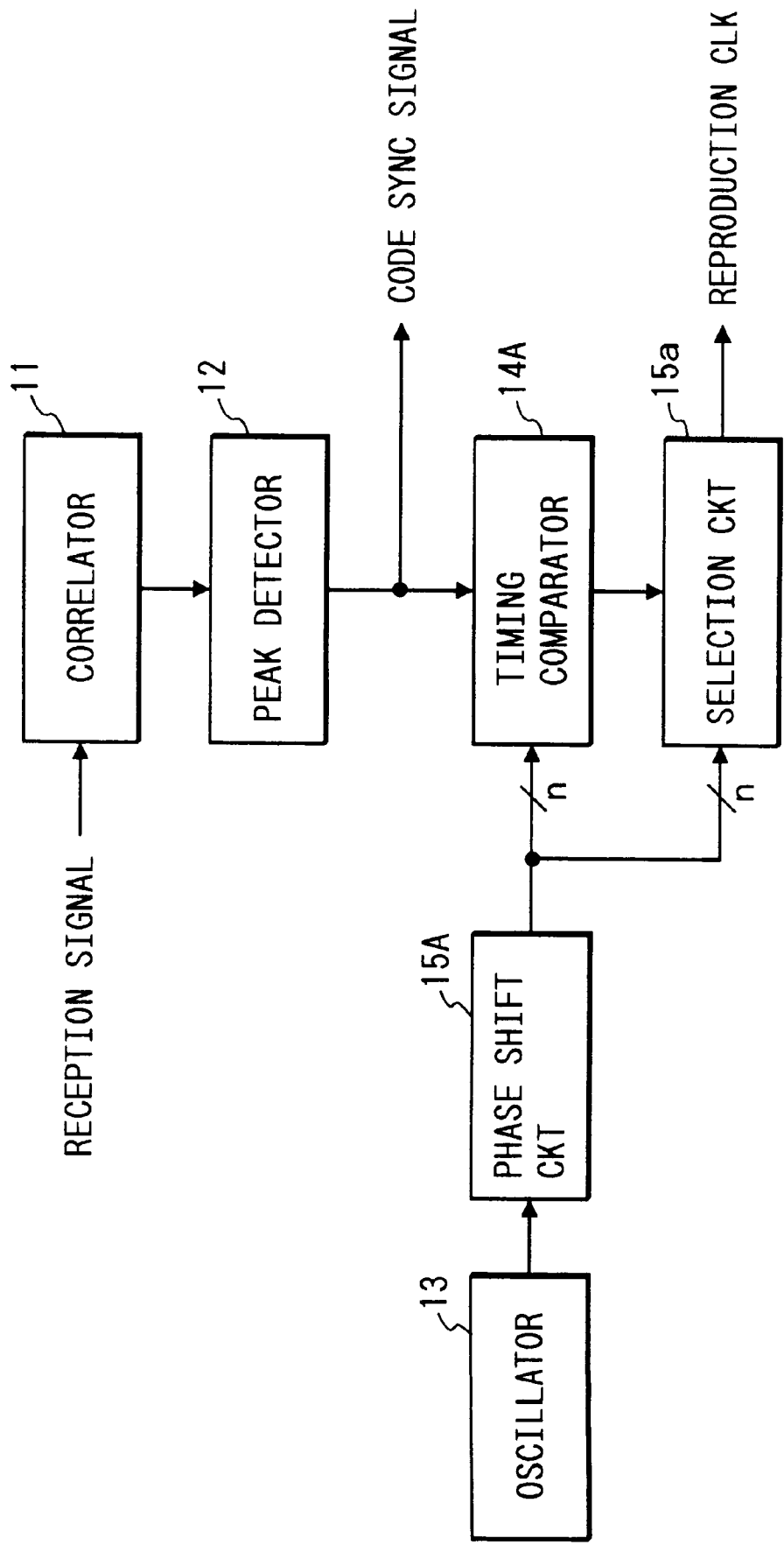
FIG. 6 is a block diagram showing the third embodiment of the invention.

FIG. 6 is a block diagram showing a construction of a sync circuit of a receiving apparatus of a spread spectrum communication system according to the third embodiment.

In FIG. 6, the correlator 11, peak detector 12, and oscillator 13 are similar to those in FIG. 2.

Figure 7:
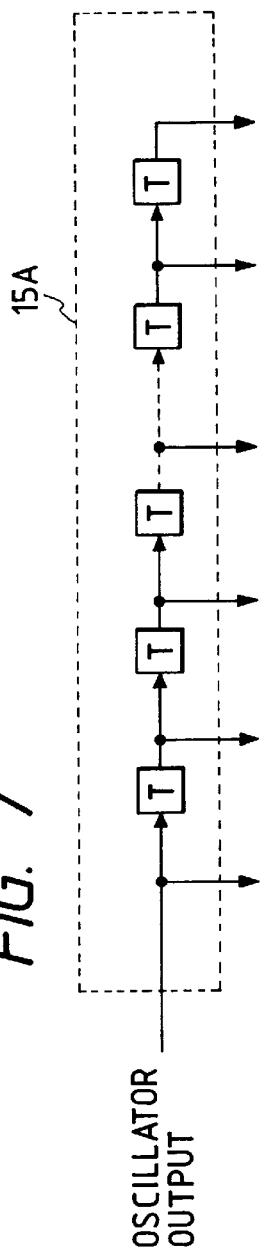
FIG. 7 is a block diagram showing a phase shift circuit 15A.

A phase shift circuit 15A outputs a plurality of (n) phase shift signals whose phases are shifted at almost equal intervals with a stable frequency of the oscillator 13 held. FIG. 7 shows a construction of the phase shift circuit 15A. A timing comparator 14A compares the peak timing signal from the peak detector 12 and a plurality of output signals from the phase shift circuit 15A, thereby searching the phase shift signal whose timing is closest to the peak timing signal.

Figure 8:
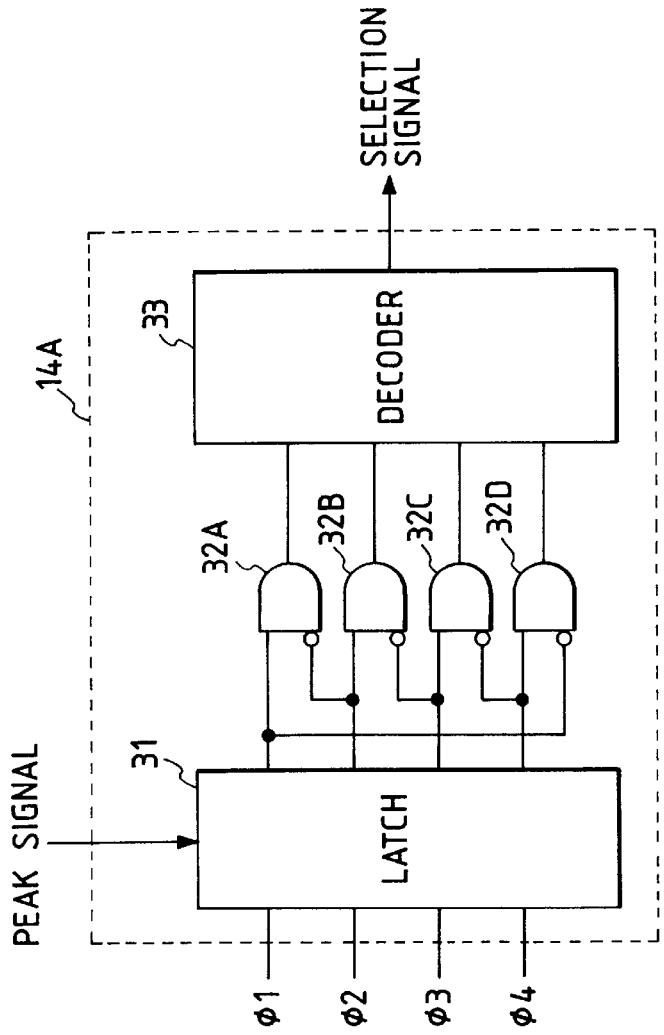
FIG. 8 is a block diagram showing a timing comparator 14A.

The timing comparator 14A is constructed as shown in, for example, FIG. 8. Explanation will now be described on the assumption that n=4.

The signals whose phases are shifted at almost equal intervals from the phase shift circuit 15A are sequentially set to $\phi 1$, $\phi 2$, $\phi 3$, and $\phi 4$ in accordance with the order of the early phase. The signals $\phi 1$, $\phi 2$, $\phi 3$, and $\phi 4$ are respectively held at the timing of the peak signal as an output from the peak detector 12 by a latch 31.

In response to the signals held, the signals which are neighboring with respect to the phase order are compared by gates 32A to 32D, thereby outputting the signal corresponding to the signal whose timing is closest to the peak timing signal. Further, a decoder 33 converts those signals to a selection signal indicating which one of the signals $\phi 1$, $\phi 2$, φ3, and φ4 a selection circuit 15a should select and outputs the selection signal.

In response to the selection signal from the timing comparator 14A, the selection circuit 15a selects and outputs one of a plurality of (n) phase shift signals as a reproduction clock from the phase shift circuit 15A. The reproduction clock can be selected at a phase interval of 360/n [deg] by n phase shift signals. As the value of n is large, a precision of the selection phase rises and it is desirable to set the value of n to 3 or more.

The signal that is outputted from each block is schematically common to that in FIG. 4.

In the embodiment, the reception signal subjected to proper signal processes by the high frequency unit 21 is subjected to a correlation arithmetic operation with the reference code by the correlator 11. When the reference code coincides with the reception signal, a relatively large peak output is derived by the correlator 11. The correlation output is inputted to the peak detector 12. The peak timing signal indicative of the peak position is formed and outputted for the peak output exceeding a threshold value which has variably or fixedly been set.

A clock of a frequency which is almost equal to a chip speed of the spreading code on the transmission side is outputted from the oscillator 13 and is inputted to the phase shift circuit 15A. The phase shift circuit 15A directly outputs the clock of a stable frequency from the oscillator 13 or converts the clock to a plurality of phase shift signals and outputs them.

In place of shifting the output of the oscillator 13 by the phase shift circuit 15A and outputting a plurality of phase shift signals, it is also possible to use an oscillator which oscillates at a frequency that is n times as high as the chip speed of the spreading code on the transmission side.

The phase shift signal and peak timing signal are inputted to the timing comparator 14A. The phase shift signal whose timing is closest to the peak timing signal is searched. The selection signal is outputted to the selection circuit 15a.

The selection circuit 15a selects one of the plurality of phase shift signals of the phase shift circuit 15A by the selection signal and outputs as a reproduction clock. The relation between the phase shift signal whose timing is closest and the phase shift amount is determined in consideration of the circuit delay or the like.

The reproduction clock is inputted to the demodulation unit 23 together with the code sync signal and the data demodulation is executed. The code sync signal can be formed from the peak timing signal.

The fourth embodiment of the invention will now be described.

Figure 9:
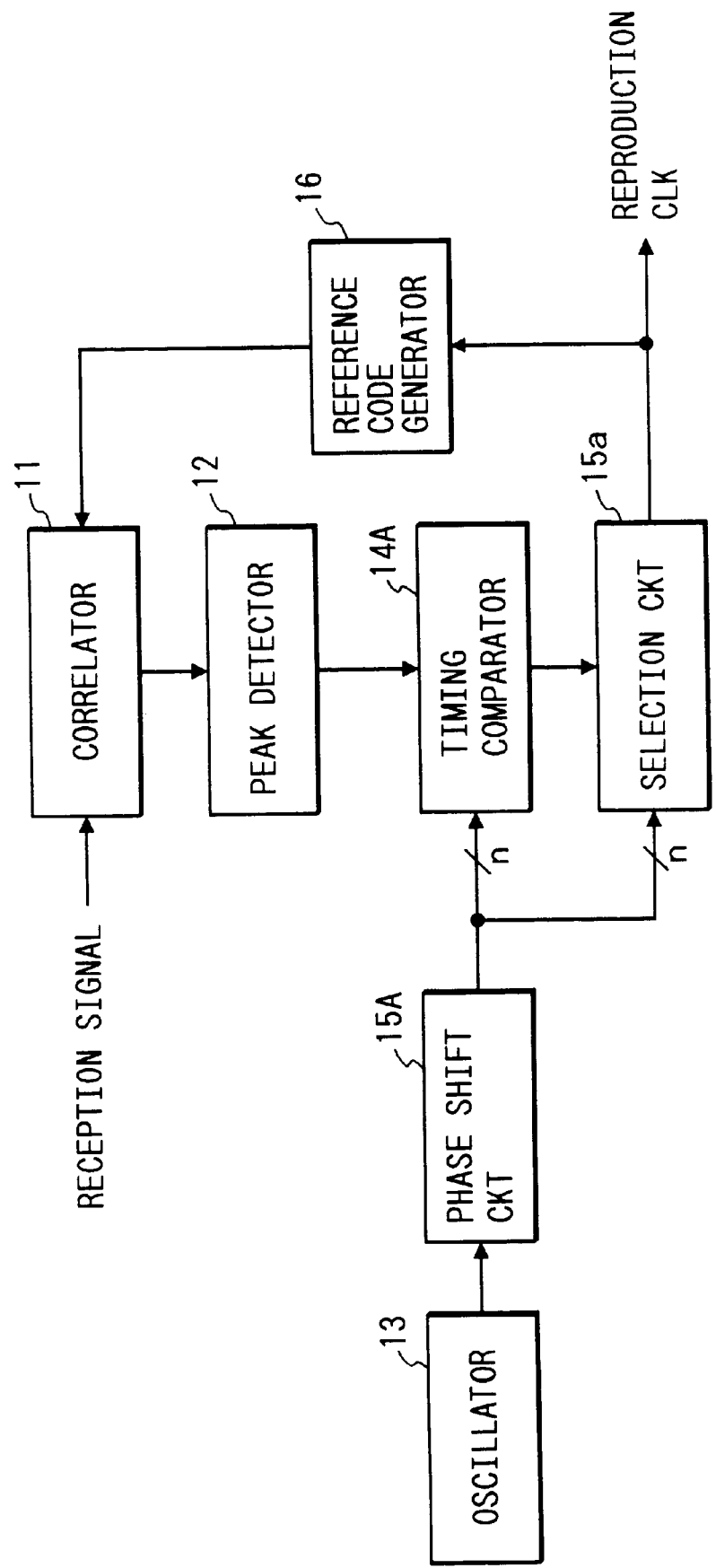
FIG. 9 is a block diagram showing the fourth embodiment of the invention.

FIG. 9 is a block diagram showing a construction of a sync circuit of a receiving apparatus of a spread spectrum communication system in the fourth embodiment.

The fourth embodiment relates to a construction in the case where a device/circuit such as a surface acoustic convolver or the like for inputting the reference signal from the outside is used as a correlator 11. In FIG. 9, the fourth embodiment differs from the third embodiment with respect to a point that the reproduction clock which is outputted from the selection circuit 15a is inputted to the reference code generator 16 and the reference code which is outputted from the reference code generator 16 is inputted to the correlator 11. The other construction is common to that in the third embodiment. In FIG. 9, component elements similar to those in FIG. 6 are designated by the same reference numerals. The reference code generator 16 in FIG. 9 has the counter 17 of FIG. 5 therein and generates the code sync signal.

Even with the construction of the fourth embodiment, operation and effect similar to those in the third embodiment are also obtained. Similar operation and effect are also derived even when the clock which is inputted to the reference code generator 16 is not the reproduction clock but the signal which is generated from the oscillator 13.

Figure 10:
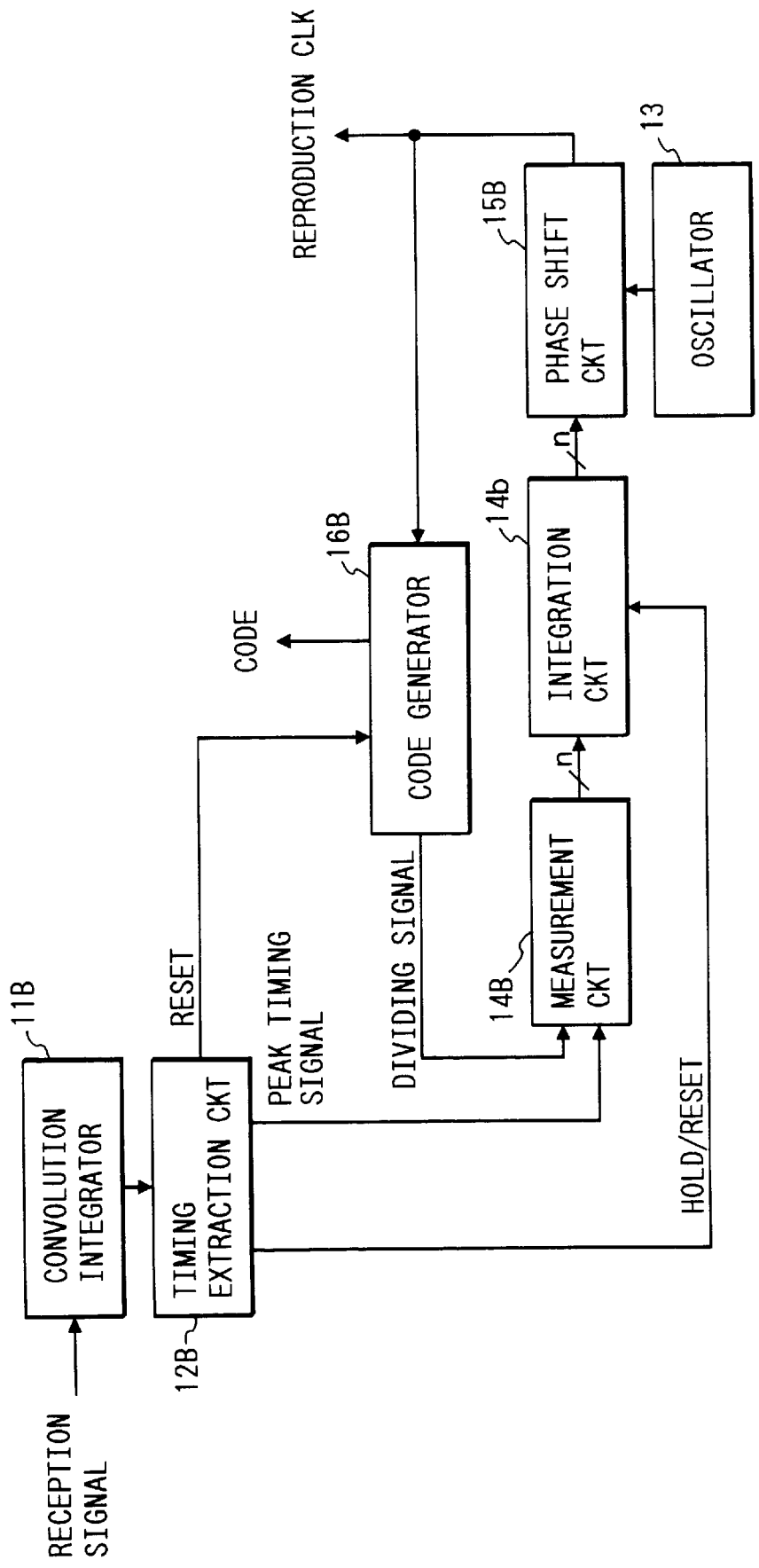
FIG. 10 is a block diagram showing the fifth embodiment of the invention.

FIG. 10 is a circuit diagram of a fifth receiving apparatus embodying the invention. In the diagram, reference numeral 11B denotes the convolution integrator for outputting a signal corresponding to the convolution integration of the reception signal and the output of the code generator 16B or the convolution integration of the reception signal and the code written in the convolution integrator 11B. Reference numeral 12B denotes the timing extraction circuit for detecting the timing of the maximum value of the convolution integration values, outputting a peak timing signal, detecting a timing of a preamble, and outputting an output hold timing and a reset timing of an integration circuit 14b. Reference numeral 14B denotes a time interval measurement circuit for inputting the peak timing signal and a dividing signal from the code generator 16B, comparing the leading or trailing timings of both signals, and outputting a time difference between those timings as a digital value of n bits in which information indicating which one of two inputs has arrived first is included in the code. Reference numeral 14b denotes the integration circuit for receiving digital outputs of the time interval measurement circuit 14B and sequentially integrating them. Reference numeral 13 denotes the oscillator for outputting a sine wave of a stable frequency. The stable frequency is set to be almost equal to the frequency of the clock used in the spread spectrum modulation on the transmission side except that there is only a slight difference between them.

Reference numeral 15B denotes a phase shift circuit for receiving the signal from the oscillator 13 and outputs the signal which has the same frequency as the frequency generated from the oscillator 13 and which has been converted to the phase that is proportional to the digital value of the n-bit signal from the integration circuit 14b. An output signal of the phase shift circuit 15B is also used as a reproduction clock for data reproduction by the demodulation unit 23 (FIG. 1). Reference numeral 16B denotes the code generator for receiving the signal from the phase shift circuit 15B and generating the same code as the PN (pseudo noise) code used in the spread spectrum modulation on the transmission side on the basis of the phase of the output of the phase shift circuit 15B. The code generator 16B also outputs a dividing signal obtained by frequency dividing the input signal from the phase shift circuit 15B in accordance with a length of the code. The code generator 16B resets a code to be outputted to the head by a reset timing signal from the timing extraction circuit 12B. The code from the code generator 16B is used for de-spreading by the demodulation unit (FIG. 1). The code generator 16B supplies the reference code to the convolution integrator 11B.

A state in which the synchronization between the sync clock and the reception code timing is not obtained for the input signal in the initial state is assumed. In this state, the dividing signal which is formed from the sync clock is not synchronized with the peak timing signal that is formed from the reception signal or the convolution arithmetic operation of the reception signal and the code of the code generator 16B. First, the timing extraction circuit 12B detects the head timing of the reception code from the reception code timing and outputs a reset signal and resets the code which is outputted from the code generator 16B to the head value. At this time point, the synchronization relation of the code has a time difference corresponding to the phase deviation between the reception signal and the reproduction clock in the receiving apparatus. Therefore, the time interval measurement circuit 14B outputs a value X based on the phase deviation.

The integration circuit 14b stores the value X which was first inputted and generates the value X as it is. The value X is supplied to the phase shift circuit 15B. The output of the phase shift circuit 15B has the same frequency as that of the oscillator 13 and changes the phase to a magnitude that is proportional to the value X. The code generator 16B outputs the dividing signal on the basis of the new phase and supplies to the time interval measurement circuit 14B. By deciding the changing direction so as to negatively feed back the loop, the timing of the dividing signal coincides with the timing of the peak timing signal and the synchronization of the clock is established. Therefore, the reproduction clock is synchronized with the reception signal.

After completion of the establishment of the synchronization in a preamble interval for the clock reproduction and code timing reproduction, by receiving an output hold timing from the timing extraction circuit 12B, the integration circuit 14b holds the output and keeps the output of the phase shift circuit 15B constant for a subsequent data transmission interval. Since the frequency of the reproduction clock held extremely accurately coincides with the clock on the transmission side as mentioned above, the data can be reproduced with a permissible phase error in the data of a long interval corresponding to a small error between those timings.

Since a precision of the output frequency of the oscillator 13 is generally set to about 1 ppm ($10^{-6}$), the frequency precision can be easily realized.

Figure 11:
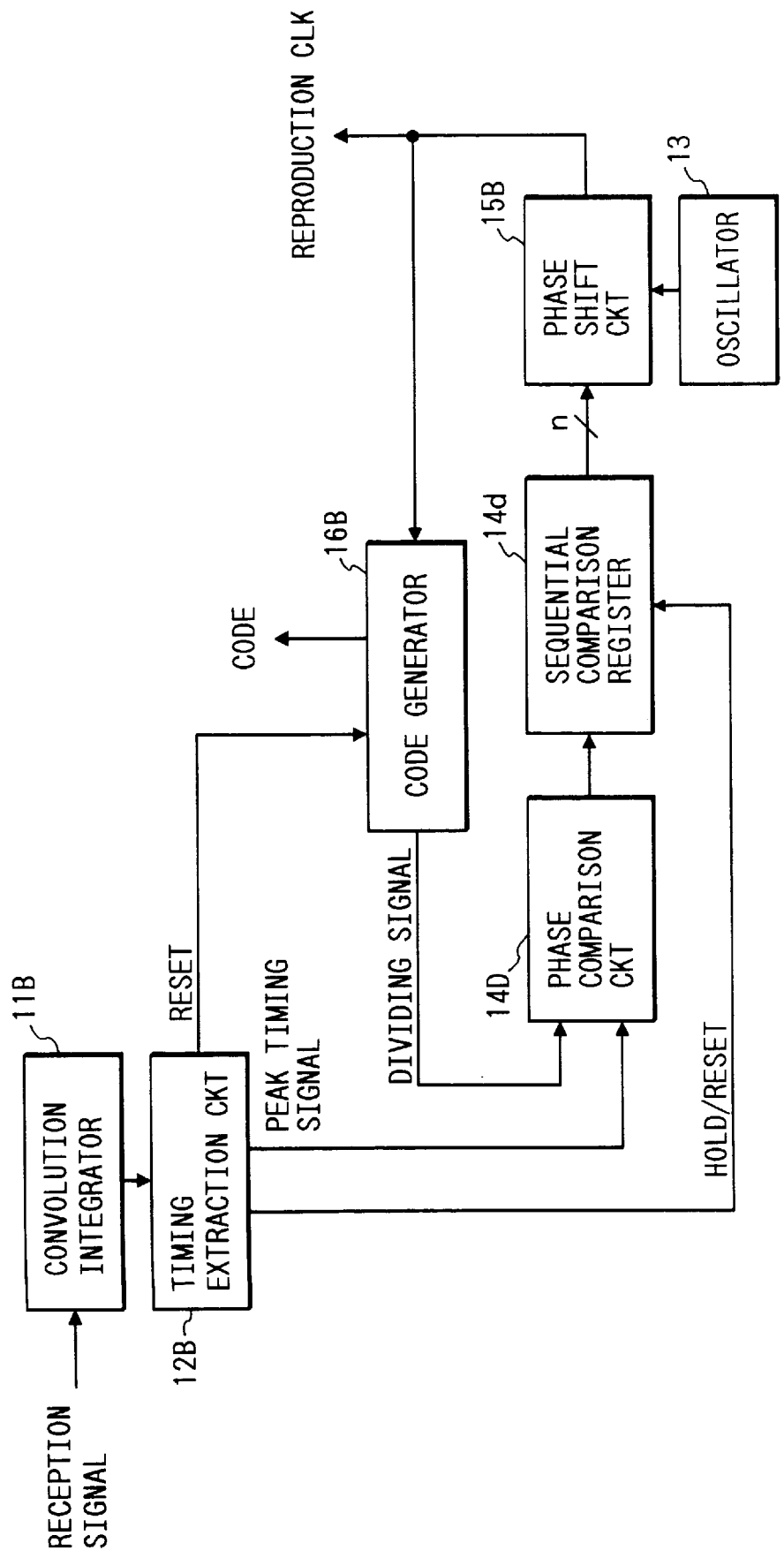
FIG. 11 is a block diagram showing the sixth embodiment of the invention.

FIG. 11 is a circuit diagram of a sixth receiving apparatus embodying the invention. In the diagram, reference numeral 12B denotes the timing extraction circuit for detecting the timing of the maximum value of the convolution integration values, outputting the peak timing signal, detecting the preamble timing, and outputting an output hold timing and a reset timing of a register 14d. Reference numeral 14D denotes a phase comparison circuit for receiving the peak timing signal and the dividing signal from the code generator 16B, comparing the leading or trailing timings of both signals, and outputting information indicating which one of the two inputs has arrived first as a digital value of one bit. Reference numeral 14d denotes the sequential comparison register for deciding the phases of the dividing signal to be subsequently compared with the peak timing signal on the basis of a digital output of the phase comparison circuit 14D.

Reference numeral 15B denotes the phase shift circuit for receiving the signal from the oscillator 13 and outputs the signal which has the same frequency as the frequency which is generated by the oscillator 13 and which was converted to the phase that is proportional to the digital value of the n-bit signal from the register 14d. The output signal of the phase shift circuit 15B is also used as a reproduction clock for data reproduction. The convolution integrator 11B, oscillator 13, and code generator 16B are common to those in FIG. 10.

A state in which the synchronization between the sync clock and the reception code timing is not obtained for the input signal in an initial state is now assumed. In this state, the dividing signal which is formed from the sync clock is not synchronized with the peak timing signal which is formed from the reception signal or the convolution arithmetic operation of the reception signal and the code of the code generator 16B. First, the timing extraction circuit 12B detects the head timing of the reception code from the reception code timing, outputs a reset signal, and resets the code which is generated from the code generator 16B to the head value. At this time point, the synchronization of the code has a time difference corresponding to the deviation of the phases between the reception signal and the reproduction clock in the receiving apparatus. Therefore, the phase comparison circuit 14D outputs a digital value on the basis of the phase deviating direction.

The sequential comparison register 14d outputs a phase shift amount of the dividing signal to be sequentially compared with the peak timing signal from the value that was first inputted. The shift amount is inputted to the phase shift circuit 15B. The output of the phase shift circuit 15B has the same frequency as that of the oscillator 13 and changes the phase to a magnitude that is proportional to the shift amount. On the basis of the new phase, the code generator 16B outputs the dividing signal and again supplies to the phase comparison circuit 14D. The sequential comparison register 14d stores a procedure for making the phase coincide from the signal of the phase deviating direction which was first inputted. Therefore, the timings of the dividing signal and the peak timing signal finally coincide in accordance with the procedure and the synchronization of the clock is established. Therefore, the reproduction clock is synchronized with the reception signal. Although many procedures are considered as the above procedure, it is not limited to one procedure here.

For example, in the first procedure, the phase shift circuit 15B outputs 180° as a center of the phase amount to be shifted. The phase comparison circuit 14D compares the phase of the output of the timing extraction circuit 12B and the phase of the dividing signal. The phase comparison circuit 14D judges whether the phase difference is equal to a value (0°–180°) smaller than 180° or a value (180°–360°) larger than 180°. For convenience of explanation, it is now assumed that the phase difference is equal to a small value. In the next procedure, an output of the register 14d is set to 90° corresponding to the center of a range from 0° to 180° and the phase comparison is again executed. In this instance, the phase comparison circuit 14D judges whether the phase difference is equal to a value (0°–90°) smaller than 90° or a value (90°–180°) larger than 90°. By sequentially repeating the above procedure until a phase resolution that is required as a clock synchronization is finally obtained, both phases are made coincide and the synchronization is established.

After completion of the establishment of the synchronization in the preamble interval, by receiving the output hold timing from the timing extraction circuit 12B, the output of the register 14d is held and the output of the phase shift circuit 15B is held constant for a subsequent data transmission interval. Since the frequency of the reproduction clock held and the clock on the transmission side extremely accurately coincide as mentioned above, the data reproduction can be performed at a small phase error in the data of a long interval corresponding to the error between them.

Since the precision of the output frequency of the oscillator 13 is generally equal to about 1 ppm, the frequency precision can be easily realized.

As described above, since it is sufficient to merely shift the phase in order to establish the synchronization, the synchronization can be established at a high speed.

By holding the phase shift amount as digital data when shifting from the preamble interval to the data interval, no error is caused by the analog circuit and the phase shift amount can be held. Therefore, even in a packet in which the data interval is further long, up to the last of the data can be also incorporated within the synchronization range in which the demodulation can be performed.

As for the resolution of the phase shift, in the direct spread spectrum communication, it is sufficient that the synchronization between the reproduction clock and the transmission clock is established at about 1/10 chip. Therefore, it is sufficient that the resolution of the phase is set to 4 bits (1/16). It is sufficient that the resolutions of a time interval measurement circuit 3 and a phase shift circuit 6 are set to about 4 bits. Those resolutions can be easily realized and an integrated circuit of those circuits can be also realized. In case of the resolutions in such a range, the synchronization can be also established at a resolution of 1/16 by the measurement of the time interval of one time in the time interval measurement circuit 3. The synchronizing means of a very high speed can be realized.

Expensive parts which are used in the VCO of small phase noises are eliminated. Low costs can be realized.

It is sufficient that the phase comparison circuit 14D merely has a discriminating function in only the phase direction of two inputs and the circuit is constructed by very simple parts. Therefore, further low costs and an integrated circuit can be easily realized. The operation of a code sync circuit of the resetting type according to the seventh embodiment will now be described with reference to FIG. 12.

Figure 12:
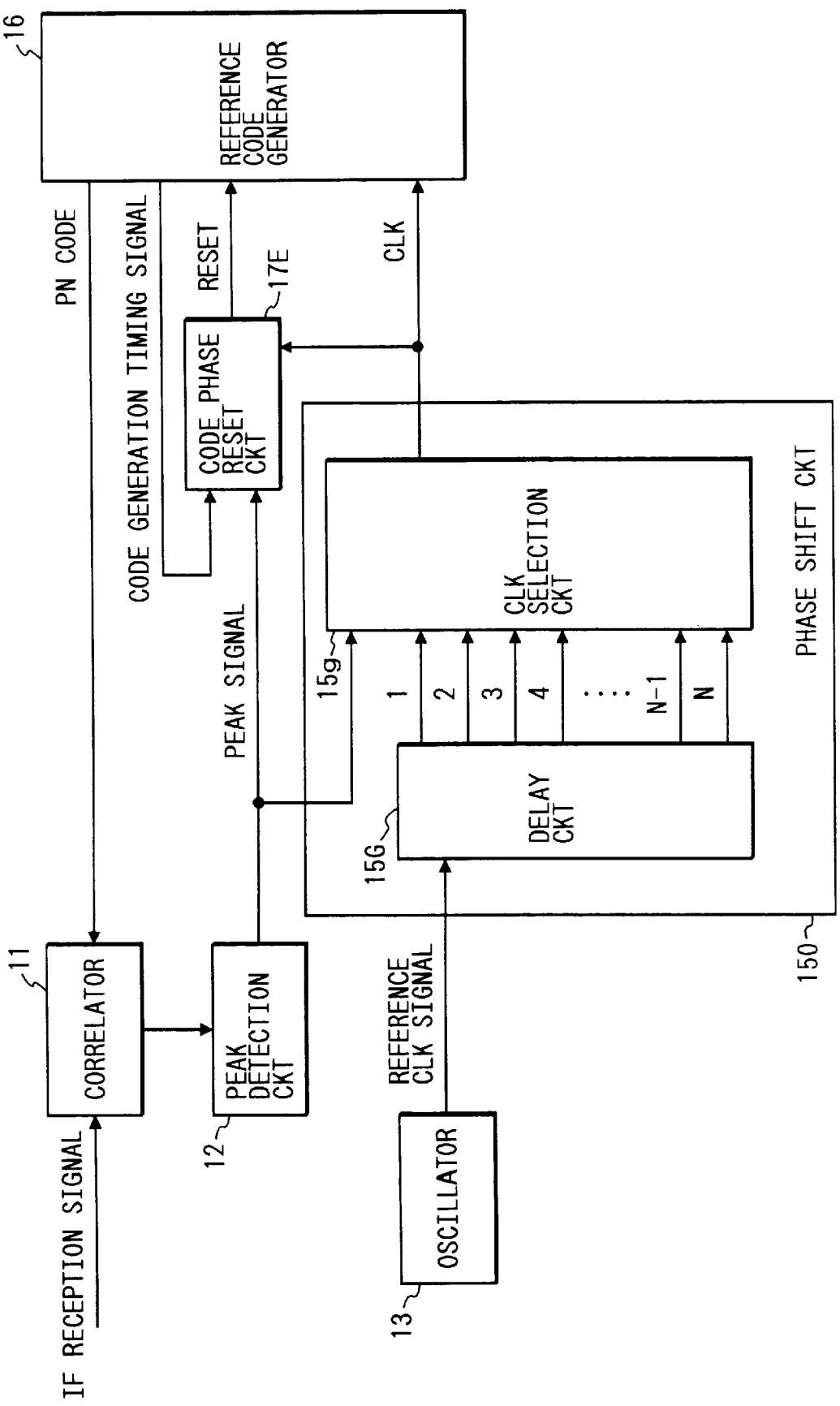
FIG. 12 is a block diagram showing the seventh embodiment of the invention.

In FIG. 12, the correlator 11 [for example, SAW (surface acoustic wave) convolver] detects the correlation between a reception IF (intermediate frequency) signal processed by the high frequency unit 21 and a reference spreading code used for de-spreading. The correlation signal is converted to a digital signal by the peak detector 12 and is outputted to a phase shift circuit 150 and a code phase reset circuit 17E.

The phase shift circuit 150 selects one of N clocks which are obtained by delaying a reference clock signal every delay amount Tc/N (Tc denotes one clock period) for one period of the clock by a delay circuit 15G. In case of performing a convolution correlation for the correlator 11 by using the SAW convolver or the like, the clock having the phase obtained by doubling the phase delay of the peak signal for the clock (hereinafter, referred to as a code clock) selected so far is selected, thereby obtaining the clock synchronization. It is also possible to construct in a manner such that a reference clock having an N-times frequency is used for the oscillator 13 and the phase shift circuit 150 starts the operation to frequency divide the reference clock into 1/N from a desired timing and outputs a code clock.

The demodulation unit 23 de-spreads synchronously with the clock selected by the clock selection circuit 15g.

When the convolution correlation is performed for the correlator 11 by using the SAW convolver or the like, the code phase reset circuit 17E outputs a code reset signal at a code phase obtained by doubling the phase delay of the peak signal for the code generation timing of the reference spreading code, thereby obtaining the code synchronization between the reference spreading code and the de-spreading code.

Figure 13:
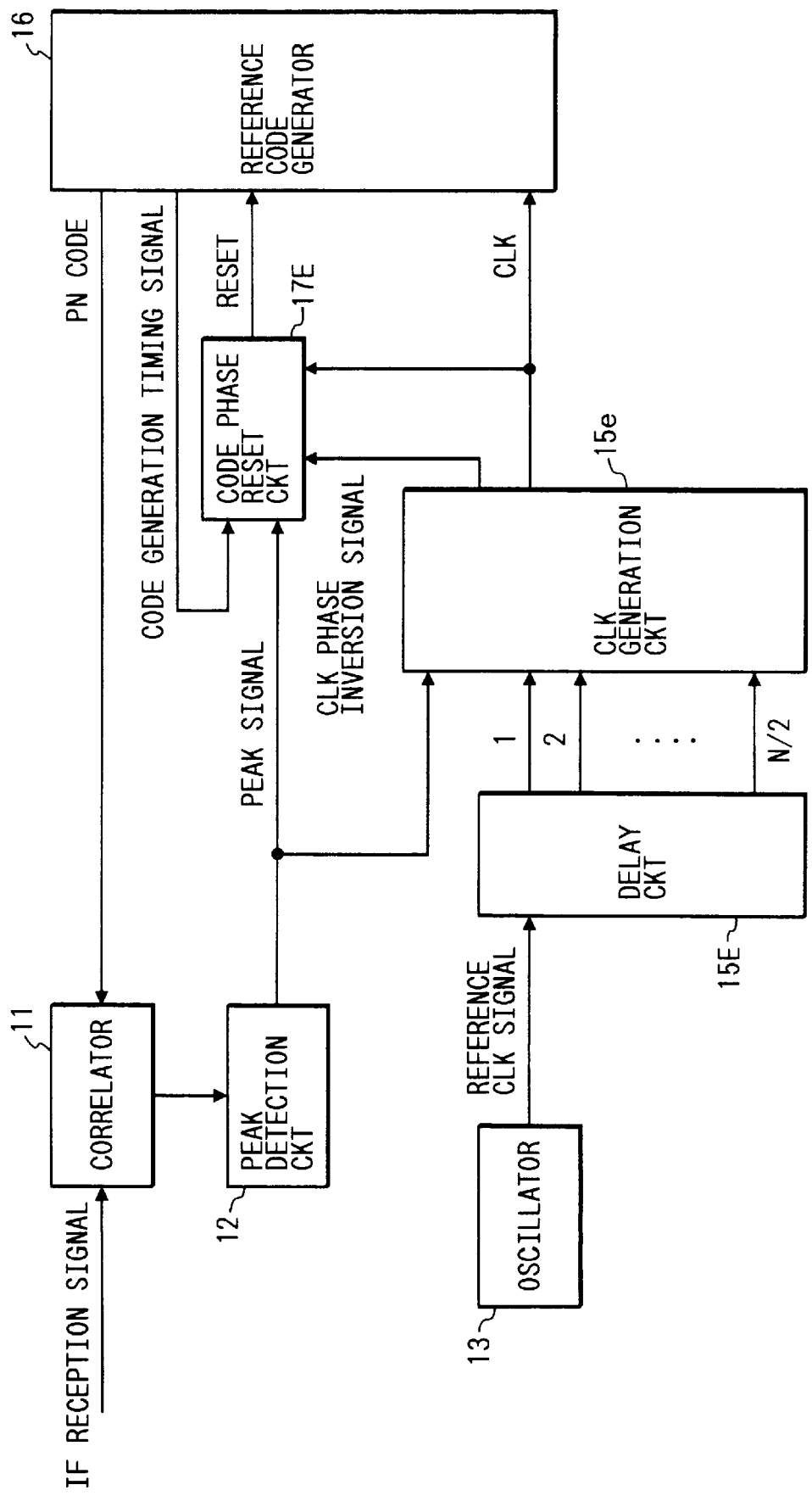
FIG. 13 is a block diagram showing the eighth embodiment of the invention.
Figure 14:
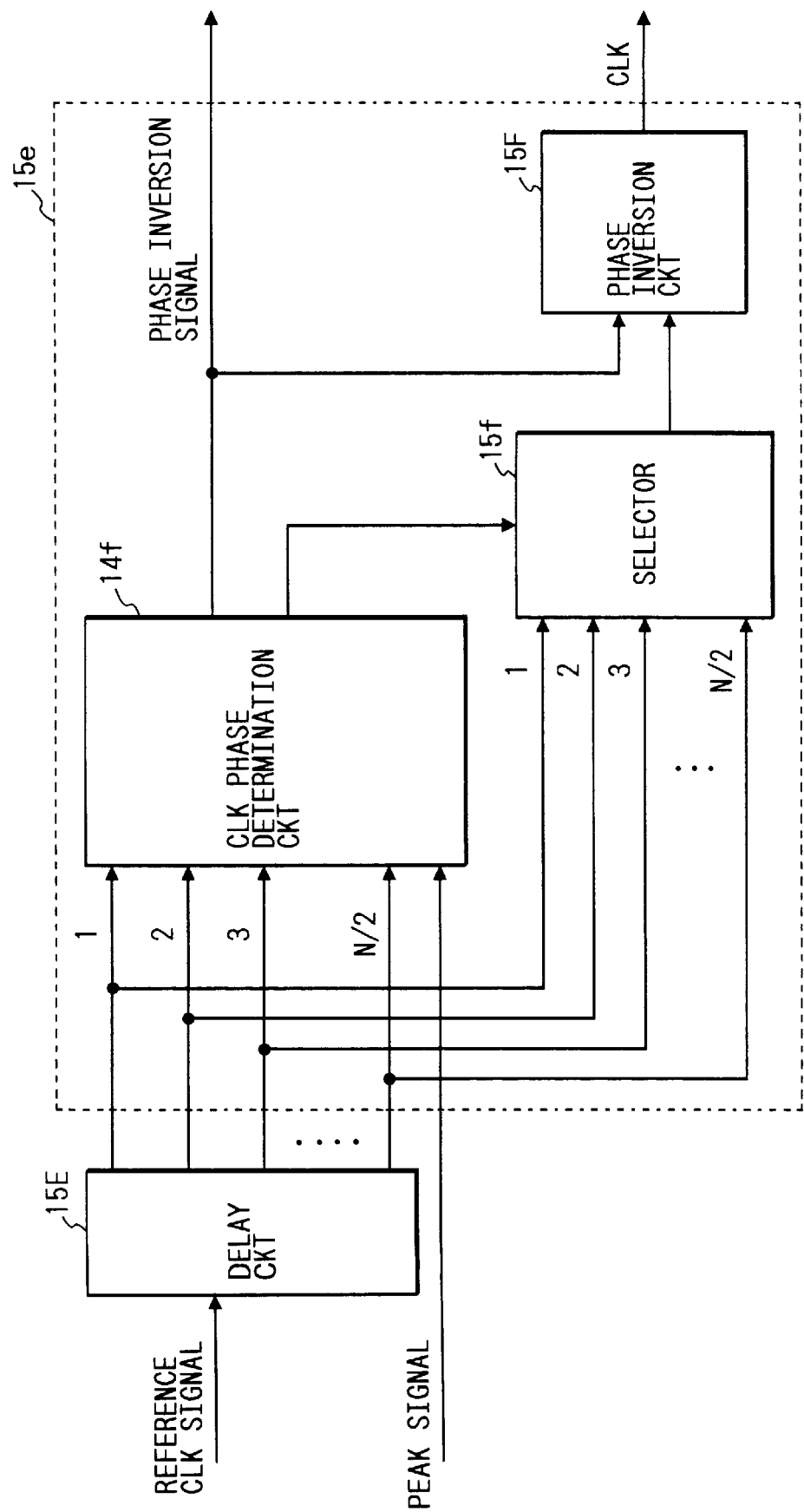
FIG. 14 is a block diagram showing a clock generation circuit 15e.

FIG. 13 is a constructional diagram of an eighth code sync circuit of the spread spectrum communicating apparatus embodying the invention. FIG. 14 is a diagram showing a construction of a clock generation circuit 15e in FIG. 13.

In FIG. 13, the correlator 11 [for example, SAW (surface acoustic wave) convolver] detects a correlation between the reception IF (intermediate frequency) signal processed by the high frequency unit 21 and the reference spreading code used for the de-spreading. The correlation signal is converted to a digital signal by the peak detector 12 and is outputted to the clock generation circuit 15e and code phase reset circuit 17E.

First, the clock generation circuit 15e will be explained. The clock generation circuit 15e detects the phase of the peak signal by using N/2 clocks which are obtained by delaying the reference clock signal from the oscillator 13 every delay amount Tc/N (Tc denotes the one clock period) for the half period of the clock by a clock delay circuit 15E. The clock generation circuit 15e subsequently calculates the phase of a clock to be newly outputted, thereby generating an output clock. The delay circuit 15E is constructed in accordance with the phase shift circuit 15A shown in FIG. 7.

FIG. 14 shows a specific construction of the clock generation circuit 15e. The clock generation circuit 15e is constructed by a clock phase determination circuit 14f, a selector 15f, and a clock phase inversion circuit 15F. The clock phase determination circuit 14f detects the phase of the correlation peak signal by using a plurality of clock signals formed by the clock delay circuit 15E and calculates the phase of a clock to be newly outputted. Further, when the calculated phase is slower than the reference clock by the half period or more, the clock phase determination circuit 14f outputs a clock phase inversion signal and requests the selector 15f to select the clock whose phase is earlier than the calculated phase by the half period. To enable the output clock to be generated at a resolution of Tc/N even with respect to the phase that is slower than the clock phase by the half period or more by inverting the clock phase, it is sufficient to set a duty ratio of each clock to about 50%. By receiving an output of the clock phase determination circuit 14f, the selector 15f forms the output clock from the plurality of clock signals. The clock phase inversion circuit 15F inverts the phase of the output clock formed when a clock phase inversion signal is received from the clock phase determination circuit 14f.

Figure 15:
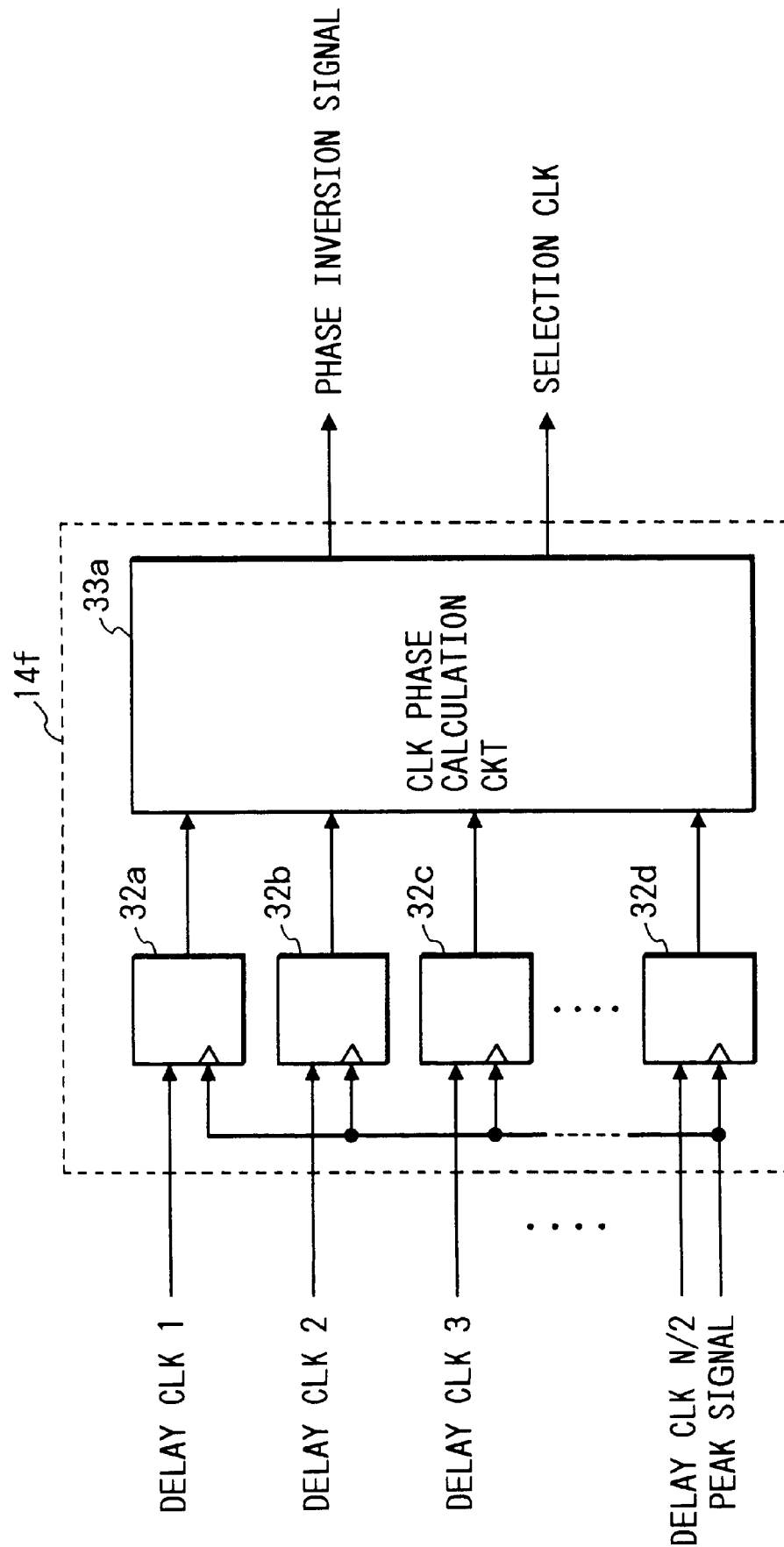
FIG. 15 is a block diagram showing a clock phase determination circuit 14f.

Specifically speaking, for instance, as shown in FIG. 15, the clock phase determination circuit 14f detects the phase of the correlation peak signal by a plurality of flip-flops 32a to 32d in each of which each delay clock is used as data and the peak signal is inputted to a CLK. By using the result of the phase detection, the phase of a clock to be newly outputted is calculated by a clock phase calculation circuit 33a.

In case of performing the convolution correlation for the correlator 11 by using the SAW convolver or the like, the phase of a clock to be newly outputted can be calculated by doubling the phase delay of the peak signal for the clock selected so far.

Figure 16:
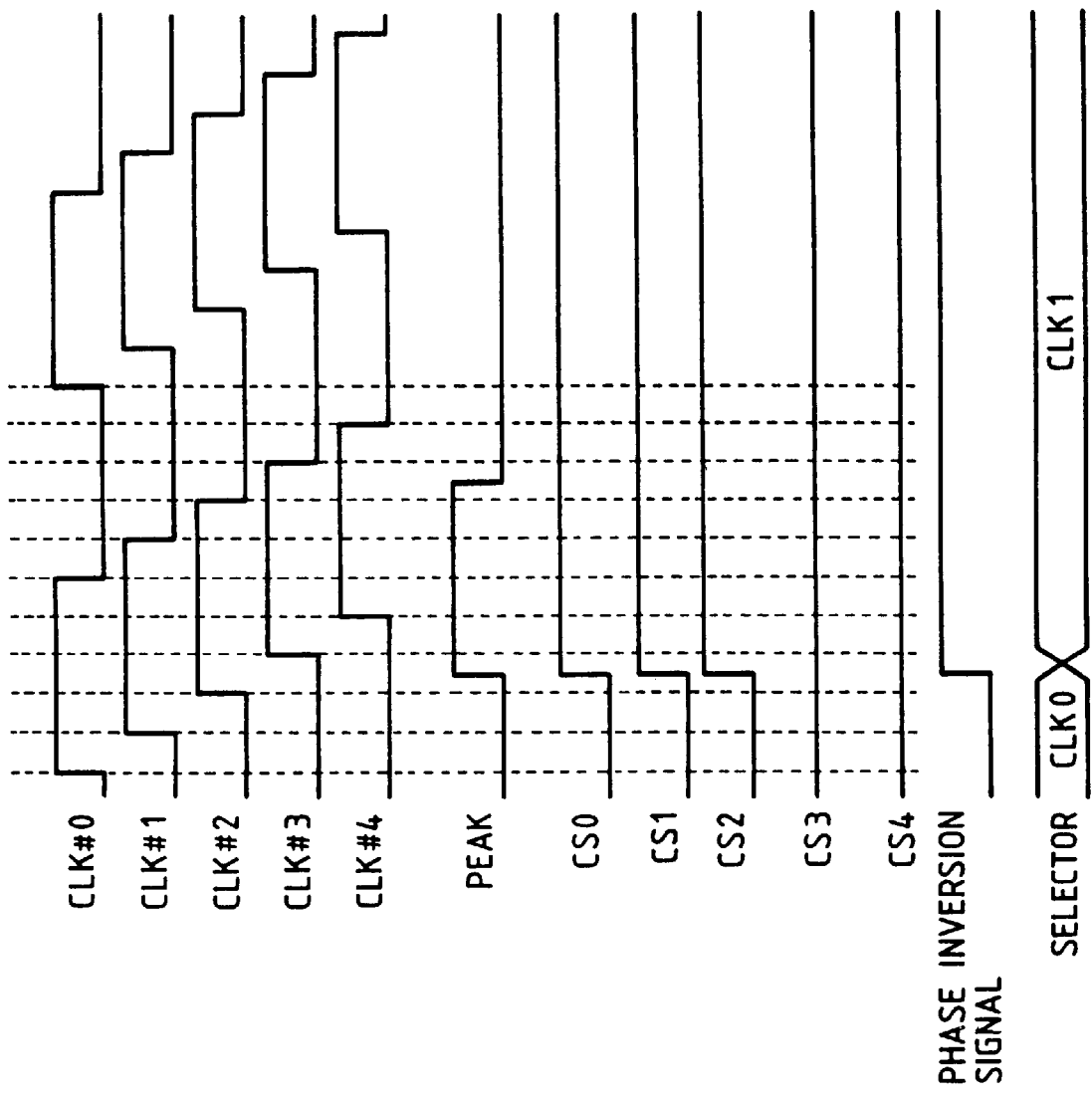
FIG. 16 is an explanatory diagram of a clock selecting method.

An example of a phase detecting method of the correlation peak signal will now be described with reference to a timing chart shown in FIG. 16. FIG. 16 shows the case of detecting the phase by using five clocks of CLK#0 to CLK#4 which were delayed every delay amount Tc/10 (Tc denotes the one clock period) by the delay circuit 15E. When the peak signal is located at positions shown in the diagram, outputs of the flip-flops 32a to 32d are as shown by CS0 to CS4. Since the outputs CS2 and CS3 differ and the output level of the previous flip-flop (CS2 in this case) is at the high level, it will be understood that the peak signal is located near the leading edge of CLK#3. Therefore, it is detected that the phase of the peak signal is located at the position that is delayed from the reference clock (in this case, CLK#0) by 3Tc/10.

Now, assuming that the peak signal is obtained by the convolution correlation by using the SAW convolver or the like as a correlator 11, the phase of the clock to be newly generated is a phase which is twice as large as the phase of the peak signal, namely, which is delayed by 6Tc/10. Since the phase of 6Tc/10 is a phase which is slower than the reference clock by the half period or more, the clock phase determination circuit 14f outputs the clock phase inversion signal and requests the selector 15f to select the clock, namely, CLK#1 that is earlier than the calculated phase by the half period, namely, that is delayed from the calculated phase by only Tc/10. The clock generation circuit 15e, therefore, outputs the clock in which the code of CLK#1 is inverted as a code clock, so that the code synchronization can be established.

The demodulation unit 23 executes the de-spreading synchronously with the clock generated by the clock generation circuit 15e.

The code phase reset circuit 17E will now be described. In case of performing the convolution correlation for the correlator 11 by using the SAW convolver or the like, the code phase reset circuit 17E outputs a code reset signal at the code phase obtained by doubling the phase delay of the peak signal for the code generation timing of the reference spreading code, thereby obtaining the code synchronization between the reference spreading code and the de-spreading code.

Since the resolution for detection of the correlation peak is set to one chip, there is a possibility such that an error of ±1 chips occurs in the code synchronization due to only the above operation. Therefore, after the clock synchronization was established by the clock generation circuit 15e and the code phase was reset even one time by the code phase reset circuit 17E, as shown in FIGS. 17A and 17B, two kinds of cases where the code synchronization is established (FIG. 17A) and where the code synchronization is deviated by one chip (FIG. 17B) are considered.

Figure 17A:
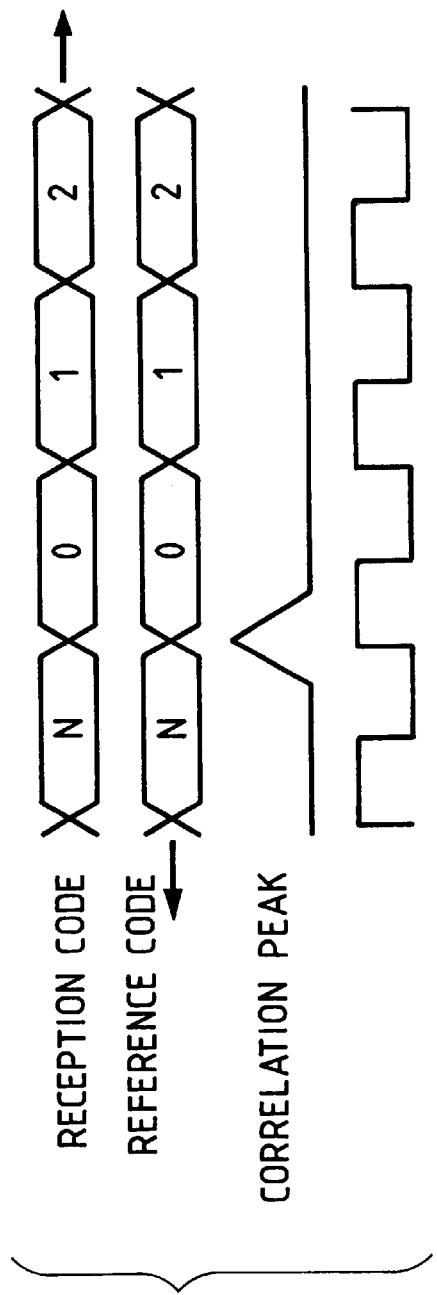
FIGS. 17A and 17B are explanatory diagrams of a detection of a code synchronization deviation.
Figure 17B:
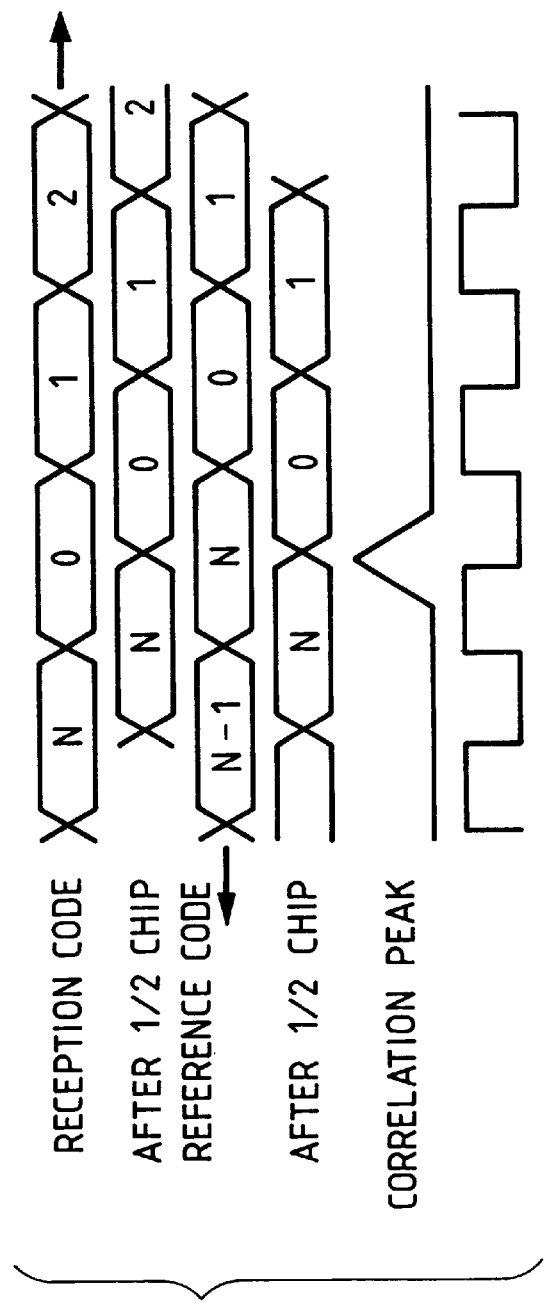
Figure 18:
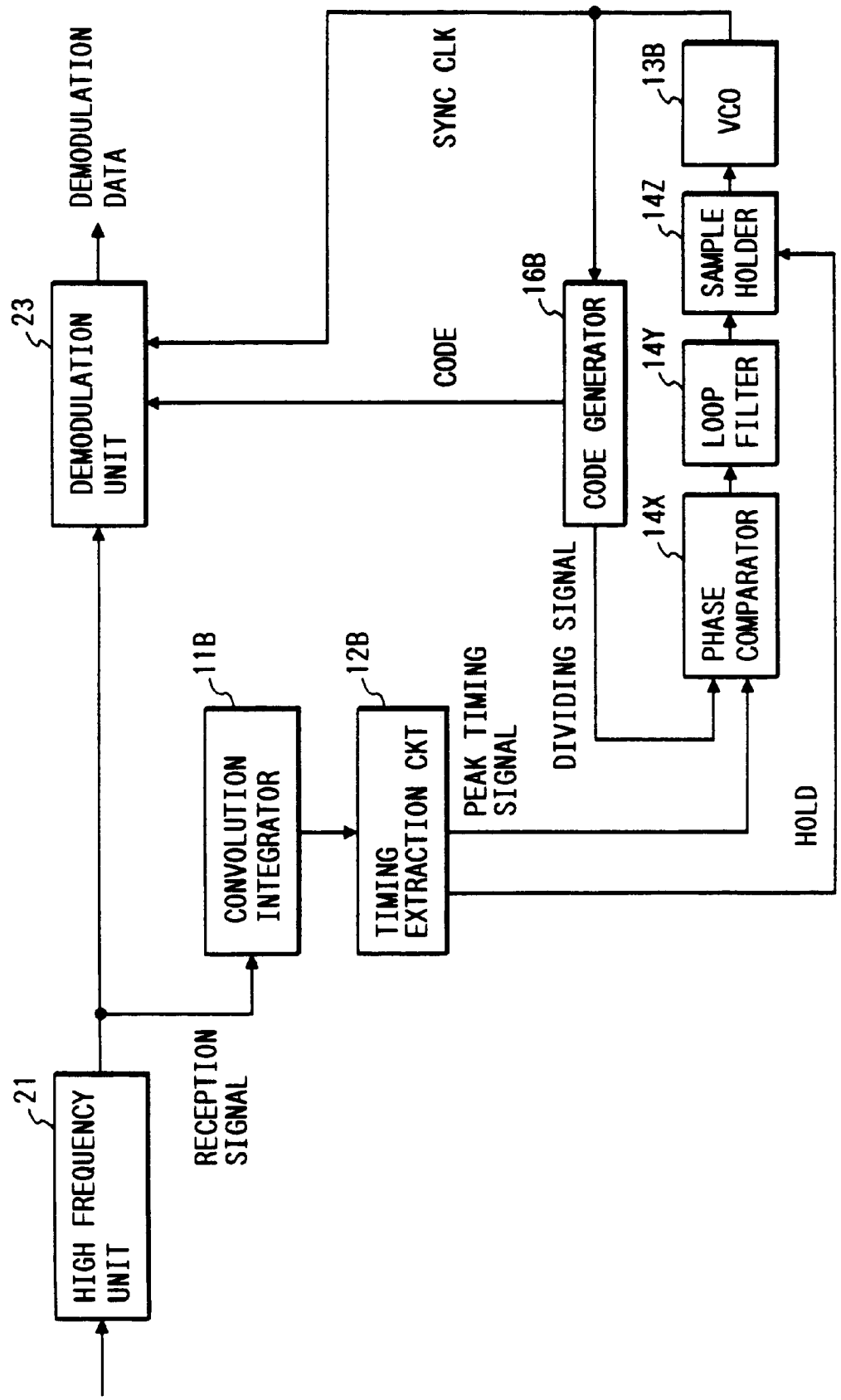
FIG. 18 is a block diagram showing a conventional apparatus.

The correlation peak in the case where the code synchronization is established as shown in FIG. 17A appears near the leading edge of the code clock. The correlation peak in the case where the code synchronization is deviated by one chip as shown in FIG. 17B appears near the trailing edge of the code clock. Therefore, after the code phase was reset even one time by the code phase reset circuit 17E, the clock phase calculation circuit 33a shown in FIG. 15 detects whether the correlation peak appears near the edge of which one of the plurality of N/2 delayed clocks. The process to double the phase delay of the peak signal for the selected clock is not performed but the clock indicative of the phase of the correlation peak signal and the phase inversion signal are outputted as they are. When the phase inversion signal at the time point when the code clock was generated and the subsequent phase inversion signal are different, the code phase reset circuit 17E regards that the code synchronization is deviated by one chip, thereby advancing or delaying the output timing of the code phase reset signal by one clock in accordance with the relation between the peak signal and the code generation timing signal. However, even when the phase inversion signals differ, the phase inversion circuit 15F doesn't invert the phase of the output clock. For example, in case of selecting the inversion of CLK#1, when the code synchronization is deviated by one chip, the correlation peak appears near the leading edge of CLK#1, so that the phase inversion signal is turned off from the on-state. When the code synchronization is established, the correlation peak appears near the trailing edge of CLK#1, so that the phase inversion signal is held in the on-state.

Therefore, a state in which the code synchronization is deviated by ±1 chips can be accurately detected and can be corrected.

When the determination of the phase inversion or the like is digitally processed, such a processing circuit can be formed as one chip to a gate array or the like, so that the circuits around the delay circuit can be simplified and miniaturized.

In the embodiment, it is sufficient to prepare at least the clocks as many as the half period of the reference clock. The number of delay circuits can be also reduced to ½.

Further, since the pull-out of the code synchronization is detected from the deviation between the correlation peak and the code clock after the clock synchronization was established and the output timing of the code phase reset signal is advanced or delayed by one clock. Therefore, since the pull-out of the code synchronization of ±1 chips is prevented, the reliability of the information demodulation is raised. An error rate can be reduced.

Although the present invention has been described above with respect to the preferred embodiments, the invention is not limited to the foregoing embodiments but many modifications and variations are possible within the spirit and scope of the appended claims of the invention.

What is claimed is:

1. A spread spectrum receiving apparatus comprising:
   convolution integrator means for outputting an integration signal corresponding to a convolution integration of a reception signal and a code;
   generating means for generating a clock;
   judging means for judging which one of the integration signal representing a code timing in the reception signal and a start of a code for synchronization of reception comes first, and for outputting a signal having a digital value of one bit as a judging result;
   determining means for determining a phase shift amount in accordance with the digital value signal outputted by said judging means;
   shift means for shifting the clock generated by said generating means in accordance with the phase shift amount determined by said determining means; and
   de-spreading means for de-spreading the reception signal in accordance with the clock shifted by said shift means.

2. An apparatus according to claim 1, wherein said de-spreading means generates the code for reception in accordance with the reference clock whose phase was shifted by said means.

3. A spread spectrum receiving apparatus comprising:
   output means for outputting a clock;
   shift means for shifting the clock outputted by said output means in accordance with code timing in a first reception signal which is received before a second reception signal;
   correlation means for correlating a correlation between the reception signal and a code for reference;
   reset means for resetting reception timing in accordance with a correlation output from said correlation means;
   judging means for judging whether a code synchronization has been established by the resetting by said reset means or not on the basis of the correlation output;
   selecting means for selecting, according to the judgment by said judging means, the clock shifted by said shift means, as a clock for de-spreading the second reception signal; and de-spreading means for de-spreading the second reception signal in accordance with the clock selected by said selecting means.

4. A spread spectrum communicating apparatus comprising:

correlation means for outputting a correlation signal between a reception signal and a spreading signal for reference;

clock generating means for generating a plurality of clocks of different phases;

clock forming means for forming a clock according to said correlation signal on the basis of said plurality of clocks generated by said clock generating means;

reset means for resetting the spreading code for reference and a de-spreading code for demodulation in accordance with said correlation output signal;

judging means for judging whether a code synchronization has been established by the reset of said spreading code for reference by said reset means or the code synchronization is deviated by one chip on the basis of said correlation signal and said plurality of clocks which are generated from said clock generating means; and control means for deviating a generation timing of said de-spreading code for demodulation of said code generating means by one clock when it is judged by said judging means that the code synchronization is deviated by one chip.

5. An apparatus according to claim 4, wherein said judging means judges whether the code synchronization has been established or is deviated by one chip in accordance with whether the clock formed by said clock forming means coincides with said correlation signal or is deviated therefrom by the half period.

6. An apparatus according to claim 1, wherein said shifting means detects the code timing in the reception signal by a correlation of the reception signal and a reference code.

7. A spread spectrum receiving method comprising the steps of:

outputting an integration signal corresponding to a convolution integration of a reception signal and a code;

generating a clock;

shifting the clock generated in said generating step in accordance with code timing in the reception signal and the reference clock; and de-spreading the reception signal in accordance with the reference clock whose phase shifted in said shifting step, wherein said shifting step further comprises the steps of judging which one of the integration signal representing a code timing in the reception signal and a start of the code for synchronization of reception comes first, outputting a signal having a digital value of one bit as the judging result, and determining a phase shift amount in accordance with the digital value signal outputted in said judging step.

8. A spread spectrum receiving apparatus comprising:

output means for outputting a reference clock;

selecting means for selecting a clock according to a code timing in a reception signal from the reference clock outputted by said output means in accordance with a code timing in said reception signal; and de-spreading means for de-spreading the reception signal in accordance with the clock selected by said selecting means, wherein said selecting means includes, correlation means for correlating a correlation between the reception signal and a code for reference, reset means for resetting a reception timing in accordance with a correlation output from said correlation means, and judging means for judging whether a code synchronization has been established by the resetting by said reset means or not on the basis of the correlation output and a plurality of reference clocks outputted by said output means, and wherein said selecting means selects the clock according to a judgment by said judging means.

9. A spread spectrum receiving apparatus comprising:

correlation means for correlating a correlation between a reception signal and a code for reference;

reset means for resetting a reception timing in accordance with a correlation output from said correlation means;

judging means for judging whether a code synchronization has been established by the resetting by said reset means or not on the basis of the correlation output;

first output means for outputting a reference clock;

second output means for outputting a clock whose phase is determined according to a code timing in the reception signal in accordance with the reference clock outputted by said first output means and the judgment by said judging means; and de-spreading means for de-spreading the reception signal in accordance with the clock outputted from said second output means.

10. An apparatus according to claim 9, wherein said reset means resets a de-spreading code.

11. An apparatus according to claim 9, wherein said second output means holds the phase of the clock during a data reception period, after the phase is determined during a preamble period.

12. A spread spectrum receiving method comprising the steps of:

correlating a correlation between a reception signal and a code for reference;

resetting a reception timing in accordance with a correlation output from said correlation step;

judging whether a code synchronization has been established by the resetting in said reset step or not on the basis of the correlation output;

outputting a clock whose phase is determined according to a code timing in the reception signal in accordance with a reference clock and a judgement in said judging step; and de-spreading the reception signal in accordance with the clock outputted in said output step.

13. A method according to claim 12, wherein a de-spreading code is reset in said reset step.

14. A method according to claim 12, wherein the phase of the clock is held in said outputting step during a data reception period, after the phase is determined during a preamble period.

* * * * *

UNITED STATES PATENT AND TRADEMARK OFFICE
CERTIFICATE OF CORRECTION

PATENT NO. : 5,917,850
DATED : June 29, 1999
INVENTOR(S) : TAKAO FUJITA, ET AL.

It is certified that error appears in the above-identified patent and that said Letters Patent is hereby corrected as shown below:

COLUMN 1

Line 66, "Further another" should read --Yet another--.

COLUMN 5

Line 42, "as" should read --it as--.

COLUMN 7

Line 16, "to" should read --it to--.

COLUMN 8

Line 20, "to" should read --it to--.
Line 22, "from" should read --with--.
Line 48, "made" should read --made to--.

COLUMN 9

Line 3, "further long," should read --longer still,--.

UNITED STATES PATENT AND TRADEMARK OFFICE
CERTIFICATE OF CORRECTION

PATENT NO. : 5,917,850

DATED : June 29, 1999

INVENTOR(S) : TAKAO FUJITA, ET AL.

It is certified that error appears in the above-identified patent and that said Letters Patent is hereby corrected as shown below:

COLUMN 11

Line 45, "of which" should read --of any--.

COLUMN 12

Line 10, "the clocks as many as" should read --clocks equal to--.

Line 32, "signal" should read --signals--.

COLUMN 13

Line 53, "signal" should read --signals--.

Signed and Sealed this

First Day of February, 2000

Attest:

Q. TODD DICKINSON

*Attesting Officer*     *Acting Commissioner of Patents and Trademarks*